United States Patent [19]

Wagner

[11] 4,349,001

[45] Sep. 14, 1982

[54] COMPACT DIESEL FUEL PREHEATER ELEMENT

[75] Inventor: William R. Wagner, Los Angeles, Calif.

[73] Assignee: Rockwell International Corporation, El Segundo, Calif.

[21] Appl. No.: 144,820

[22] Filed: May 5, 1980

[51] Int. Cl.$^3$ .............................................. F02M 31/02
[52] U.S. Cl. .................................... 123/557; 261/145; 165/52
[58] Field of Search .................... 123/557; 165/51, 52; 261/145

[56] References Cited

U.S. PATENT DOCUMENTS 1,080,139 12/1913 Corson .................................. 261/145
2,458,826 1/1949 Blumberg et al. .................. 123/557

Primary Examiner—Charles J. Myhre
Assistant Examiner—E. Rollins Cross
Attorney, Agent, or Firm—H. Fredrick Hamann; Harry B. Field

[57] ABSTRACT

In combination with a diesel engine, a preheater 10 for diesel fuel generally comprises a hot fluid chamber 12 having a first open end 14, a second open end 16, and perimeter walls 17. As the engine cooling water exits from the engine block, it passes through hot fluid inlet 18 into hot fluid inlet manifold 20, through chamber 12, and out through fluid outlet manifold 22 and hot fluid outlet port 24. Located along the top and bottom perimeter walls 17 of chamber 12 are heat exchanger plates 26 for carrying diesel fuel. Interconnected with plates 26 are fuel inlets 28, fuel inlet manifolds 30, fuel outlet manifolds 32, and fuel outlets 34.

6 Claims, 4 Drawing Figures

COMPACT DIESEL FUEL PREHEATER ELEMENT

BACKGROUND OF THE INVENTION

This invention pertains to internal combustion engines and, more specifically, to preheaters for diesel fuel.

Particulate reduction in diesel fuel combustion can be effected by diesel fuel preheating to either a hot liquid or possibly a vapor state. Within the scope of this invention several ways have been conceived to provide a sufficient quantity of heat to the fuel to reduce its surface tension, viscosity and density to a minimum to improve the prechamber vaporization and burning ability. These include: electrical heating, low fuel pressure heating with the exhaust gas or water jacket, high fuel pressure discharge line heating with exhaust gas or water jacket, and/or injector element fuel heating with precombustor gas or water surrounding the injector. All of the above concepts can be made to work since the required heat input would be less than 0.94 Btu/sec for a 180° F. diesel fuel temperature discharge.

The benefit of increasing the fuel temperature for improving the combustion efficiency of the diesel precombustor can be projected by observing the comparative smokiness in the diesel from starting cold to warm conditions. This is due to warming of the fuel delivery system and the precombustor wall elements. As shown in Table I, the fluid viscosity is markedly decreased from 60° F. to 180° F. As would be expected, the surface tension would also be reduced at higher temperatures. Both of these factors would appear to be contributory to a more rapid complete combustion in the prechamber and main chamber due to droplet size reduction effects and also a reduced vaporization time in the precombustor.

warming upstream of the fuel pump might sporadically effect the pump delivery rate. Warming of the diesel fuel after pumping to high pressure has the disadvantage of the high pressure heat exchange elements, but conversely will not affect the pumping and intake feed conditions.

The use of the engine jacket discharge water prior to radiator conditioning would appear to provide a clean, hot carbon-free temperature source if fuel temperatures up to 180° F. would be sufficient. For higher temperatures, the use of added heating by the exhaust system (to 1000° F.) can be envisioned.

SUMMARY OF THE INVENTION

Accordingly, there is provided by the present invention a diesel engine wherein the improvement comprises a diesel fuel preheater interposed between the fuel pump and the combustion chamber. The preheater heats diesel fuel prior to its being introduced into the combustion chamber, thereby reducing the surface tension, viscosity and density to a minimum and increasing heat content so as to improve the prechamber vaporization and burning ability. These factors ultimately contribute to a more rapid complete combustion in the prechamber and main chamber due to droplet size reduction effects, and also to a reduced vaporization time in the precombustor.

OBJECTS OF THE INVENTION

Therefore, it is an object of the present invention to provide a highly efficient diesel engine.

Another object of the present invention is to provide a diesel engine which burns fuel more completely.

Still another object of the present invention is to provide a diesel engine whose particulate matter output is significantly decreased.

Yet another object of the present invention is to pro-

TABLE I
EFFECTS OF TEMPERATURE ON LIGHT OIL PROPERTIES

| t °F. | w lb/ft$^2$ | $c_p^a$ Btu/lb F | $k^a$ Btu/ft hr F | $\mu^a$ lb/hr ft | $N_{Pr}$ | $N_{Pr}$ | $X^b$ sec/ft$^2$ | $Y^c$ 1/ft$^3$ F | $\beta$ 1/°F. |
|---|---|---|---|---|---|---|---|---|---|
| \multicolumn{10}{c}{Water (saturated liquid)} |
| 50 | 62.4 | 1.00 | 0.334 | 3.17 | 9.50 | 2.12 | 71,000 | 10 × 10$^6$ | 0.06 × 10$^{-2}$ |
| 60 | 62.4 | 1.00 | 0.339 | 2.71 | 8.00 | 2.00 | 82,800 | 22 | 0.10 |
| 70 | 62.4 | 1.00 | 0.344 | 2.36 | 6.86 | 1.90 | 95,000 | 35 | 0.12 |
| 100 | 62.0 | 1.00 | 0.358 | 1.66 | 4.64 | 1.67 | 134,700 | 129 | 0.22 |
| 150 | 61.2 | 1.00 | 0.382 | 1.04 | 2.66 | 1.38 | 212,000 | 445 | 0.31 |
| 200 | 60.1 | 1.01 | 0.406 | 0.738 | 1.83 | 1.22 | 294,000 | 1.08 × 10$^9$ | 0.39 |
| 250 | 58.9 | 1.02 | 0.430 | 0.555 | 1.32 | 1.10 | 382,000 | 2.35 | 0.50 |
| 300 | 57.4 | 1.03 | 0.454 | 0.448 | 1.02 | 1.00 | 462,000 | 3.90 | 0.57 |
| 400 | 53.6 | 1.08 | 0.382 | 0.327 | 0.93 | 0.98 | 590,000 | 8.40 | 0.75 |
| 500 | 49.0 | 1.18 | 0.353 | 0.261 | 0.87 | 0.95 | 676,000 | 17.4 | 1.18 |
| 537 | 47.0 | 1.24 | 0.335 | 0.246 | 0.91 | 0.97 | 688,000 | 22.4 | 1.47 |
| 572 | 44.6 | 1.37 | 0.312 | 0.233 | 1.02 | 1.00 | 689,000 | 30 | 1.96 |
| \multicolumn{10}{c}{Light Oil} |
| 50 | 57.8 | 0.43 | 0.0770 | 315 | 1700 | 12.0 | 663 | 5.5 × 10$^3$ | 0.39 × 10$^{-2}$ |
| 60 | 57.6 | 0.43 | 0.0768 | 210 | 1180 | 10.5 | 987 | 12.2 | 0.39 |
| 70 | 57.4 | 0.44 | 0.0766 | 140 | 805 | 9.3 | 1475 | 27.4 | 0.39 |
| 100 | 56.6 | 0.45 | 0.0763 | 55 | 324 | 6.8 | 3710 | 178 | 0.40 |
| 150 | 55.4 | 0.48 | 0.0756 | 19 | 121 | 5.0 | 10,500 | 1.15 × 10$^6$ | 0.41 |
| 200 | 54.2 | 0.50 | 0.0749 | 9 | 60 | 3.9 | 21,700 | 6.54 | 0.43 |
| 250 | 53.0 | 0.52 | 0.0743 | 5 | 35 | 3.3 | 38,200 | 20.6 | 0.44 |
| 300 | 51.8 | 0.54 | 0.0736 | 3 | 22 | 2.8 | 62,300 | 56.5 | 0.45 |

$^a$Substantially independent of pressure for p < 20 atm.
$^b N_{R^*} = u \rho x/\mu = X$ for $u = 1$ ft/sec and $x = 1$ ft.
$^c N_{Gr} = (\beta g \rho^2/\mu^2)d^3 \Delta t = Y$ for $d = 1$ ft and $\Delta t = 1$ F.

Of the basic heating approaches incorporated in this invention, the use of a heat exchanger to cause either warming or "vaporization" downstream of the fuel pump would appear the best. Although workable, vide a diesel engine which decreases the production of nitrous oxides.

A further object of the present invention is to provide a diesel fuel preheater.

Still a further object of the present invention is to provide a diesel fuel preheater which is readily adaptable with in-production diesel engines.

Yet another object of the present invention is to provide a diesel fuel preheater having a preheater element for each combustor, precombustor, or cylinder.

Another object of the present invention is to provide a diesel fuel preheater capable of withstanding high pressure.

Objects, advantages and novel features of the present invention will become apparent from the following detailed description of the invention when considered in conjunction with the accompanying drawings.

BRIEF DESCRIPTION OF THE DRAWINGS

The same elements or parts throughout the figures of the drawing are designated by the same reference characters, while equivalent elements bear a prime designation.

DESCRIPTION OF THE PREFERRED EMBODIMENTS

In accordance with the present invention, there is provided a diesel fuel preheater generally designated 10 for incorporating with either automotive or stationary diesel engines. The preheater 10 will warm the engine diesel fuel preferably with engine cooling water, thereby providing a low viscosity, low surface tension elevated temperature oil from small droplet formation and quick droplet burning.

Figure 1:
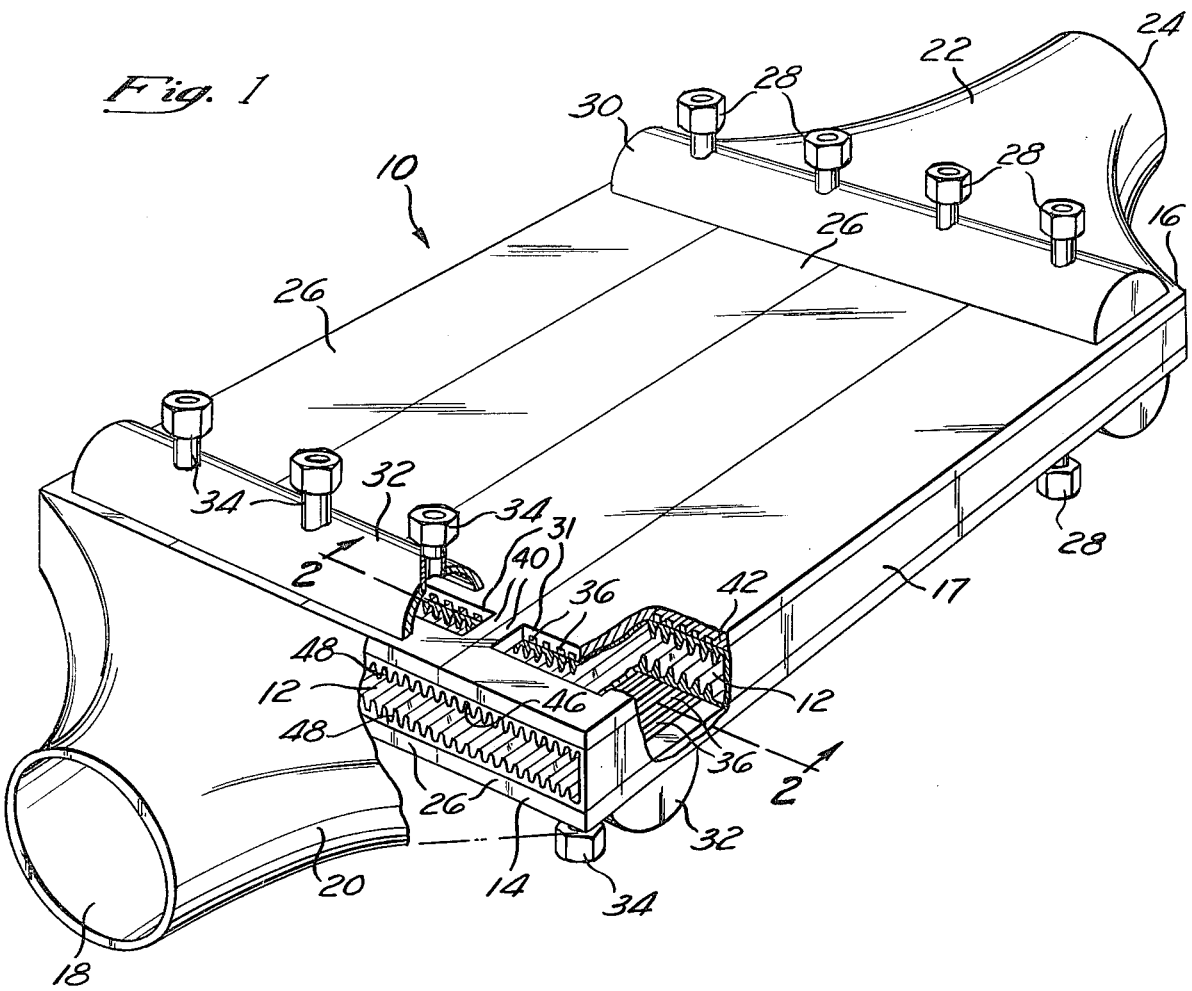
FIG. 1 is a partially cutaway schematic perspective view of the preferred configuration for the diesel fuel preheater.

FIG. 1 is a partially cutaway schematic perspective view of the diesel fuel preheater 10. The preheater 10 generally comprises a hot fluid chamber 12 having a first open end 14, a second open end 16, and perimeter walls 17. As the engine cooling water exits from the engine block (not shown) it passes through hot fluid inlet 18 into hot fluid inlet manifold 20, through chamber 12, and out through hot fluid outlet manifold 22 and hot fluid outlet port 24. Located along the exterior top and bottom perimeter walls 17 of chamber 12 are heat exchanger plates 26 interconnected with fuel inlets 28, fuel inlet manifolds 30 fuel panel inlet port 31, fuel panel outlet port 33, fuel outlet manifolds 32, and fuel outlets 34. Optionally located along the interior 46 of perimeter walls 17 are fins 48 for enhancing overall heat transfer efficiency.

Figure 2:
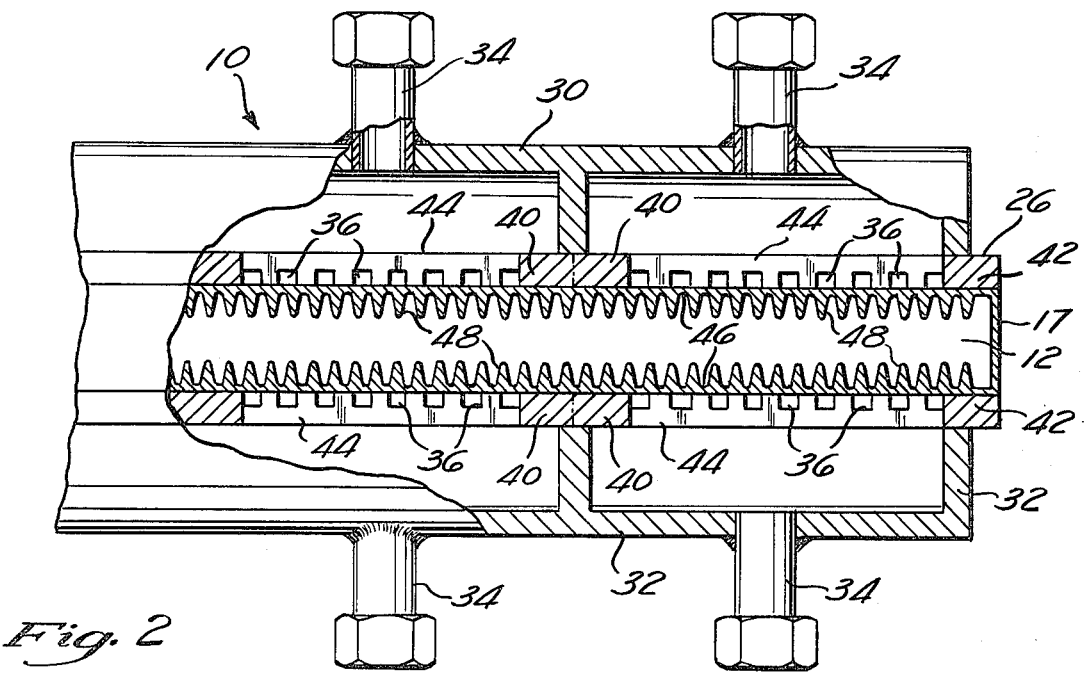
FIG. 2 is a fragmentary cross-sectional view of the diesel fuel preheater of FIG. 1 taken along line 2—2.
Figure 3:
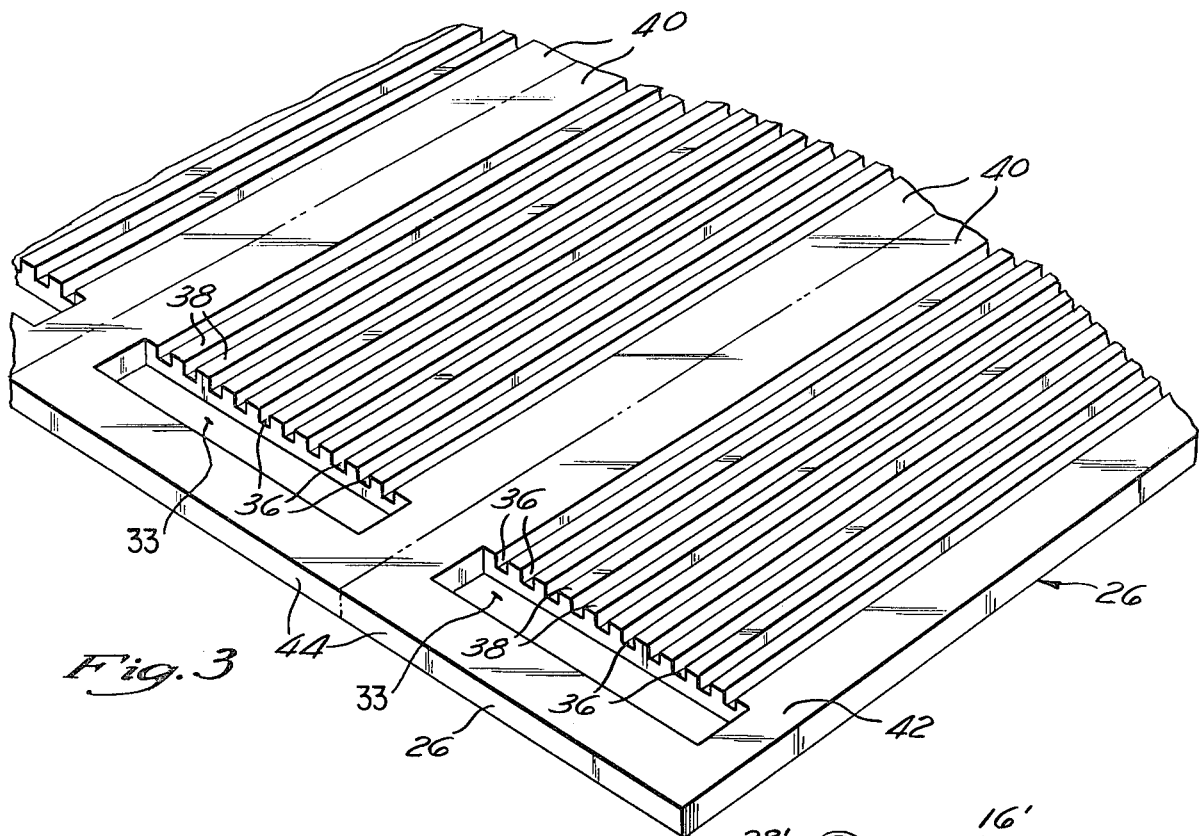
FIG. 3 is a fragmentary perspective view of the heat exchanger plate.
Figure 4:
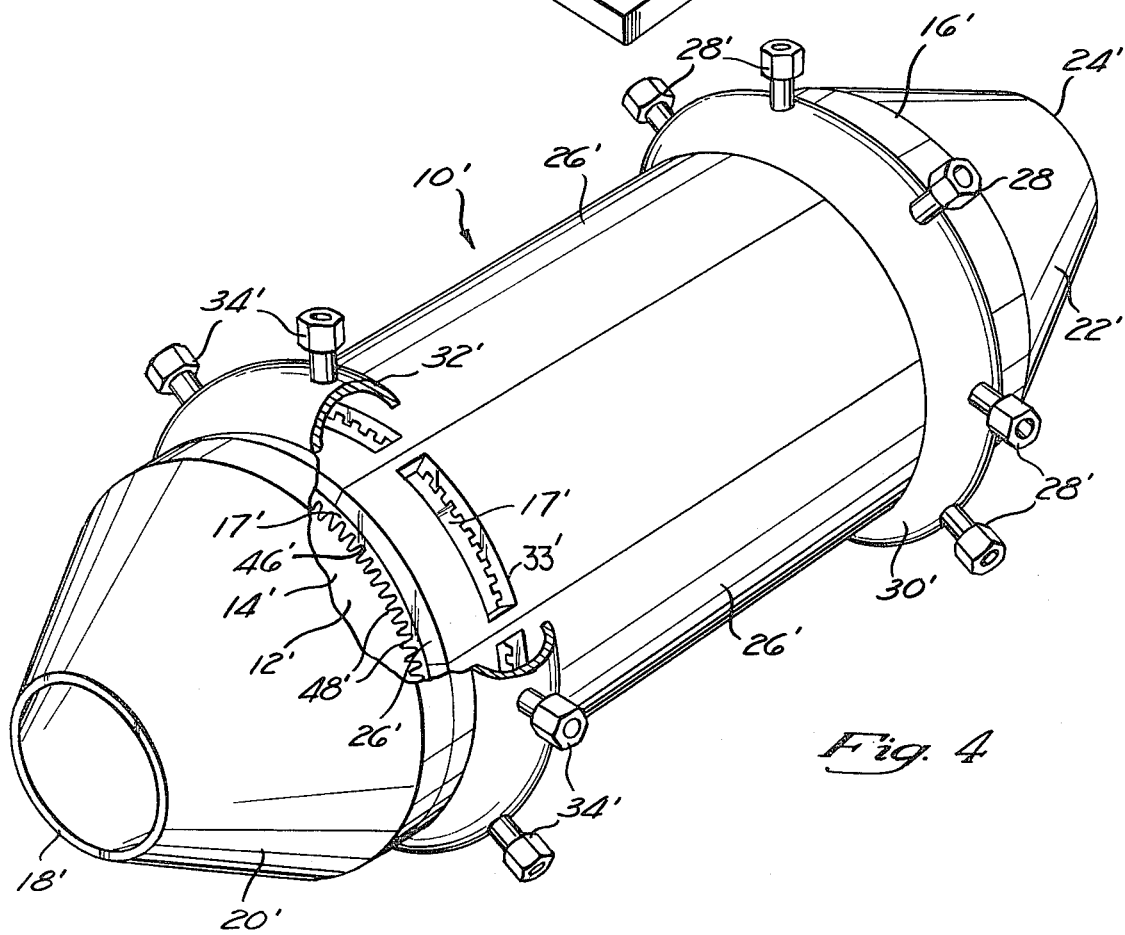
FIG. 4 is a partially cutaway schematic perspective view of a cylindrical diesel fuel preheater.

As shown in FIGS. 1-3, the preferred configuration of preheater 10 is rectangular; however, any other geometric configuration will perform adequately when properly sized. One such configuration is shown in FIG. 4 wherein the preheater 10' is cylindrical instead of rectangular. In another preferred embodiment of the present invention, preheater 10 comprises a fuel inlet 28 and fuel outlet 34 for each cylinder, precombustor, or combustor; however, one fuel inlet 28 and fuel outlet 34 could be used if the preheater 10 was placed upstream of the diesel fuel pump. Futhermore, it should be noted that although FIG. 1 shows eight individual fuel inlets 28 and fuel outlets 34, the preheater 10 could be sized for a six-cylinder diesel or for any specific number of cylinders on any diesel engine.

Turning now to FIG. 3, there is shown a schematic perspective view of heat exchanger plate 26. In its preferred configuration, plate 26 comprises a plurality of panels 44, each having x number of channels 36 and $x-1$ number of lands 38, wherein x is an integer greater than or equal to one ($x \geq 1$). Divider lands 40 as well as edge lands 42 are significantly larger than lands 38 for wherein lands 38 are primarily designed to increase heat transfer capabilities and structural integrity, divider lands 40 and edge lands 42 are primarily designed as separators or boundaries and help contain fuel flow through each panel section 44. Although divider lands 40 are designed to act as a means for preventing fuel from flowing across from one panel 44 to an adjacent panel 44, cross-leakage will not seriously affect system operation. It should be additionally noted that although it is preferred that plate 26 comprise a plurality of panels 44, channels 36, and lands 38, design requirements and preheater 10 placement could permit as low as one channel 36.

In its preferred configuration, as well as for ease of manufacture, plate 26 has been designed as a unibody plate having integral panels 44; however, specific system design could permit each panel 44 to be a separate element. In those cases, care would have to be taken so as to insure minimal chance of fuel leakage at panel edges.

Turning now to FIG. 4, there is shown a partially cutaway schematic perspective view of cylindrical diesel fuel preheater generally designated 10'. As can readily be seen, preheater 10' has all of the features of preheater 10, FIG. 1. However, for this embodiment preheater 10' has a cylindrical geometry instead of a rectangular geometry. Thus, as with preheater 10, preheater 10' generally comprises a hot fluid chamber 12' having a first open end 14', a second open end 16', and perimeter walls 17'. As the engine cooling water exits from the engine block (not shown) it passes through hot fluid inlet 18' into hot fluid inlet manifold 20', through chamber 12', and out through hot fluid outlet manifold 22' and hot fluid outlet port 24'. Located along the exterior perimeter walls 17' of chamber 12' are heat exchanger plates 26' interconnected with fuel inlets 28', fuel inlet manifolds 30', fuel panel inlet port 31', fuel panel outlet port 33', fuel outlet manifolds 32' and fuel outlets 34'. Optionally located along the interior 46' of perimeter wall 17' are fins 48' for enhancing overall heat transfer efficiency.

In the preferred operating mode, preheaters 10 or 10' operate as a countercurrent system; however, if design requires, it can be run as a parallel cross-flow or mixed-flow system. Furthermore, the interior 46 or 46' of wall 17 or 17' of chamber 12 or 12' can have its heat transfer efficiency increased by the addition of a plurality of heat transfer fins 48 or 48'. These fins 48 or 48' would help enhance the efficiency rating of the preheaters and thereby reduce the overall length and size of the desired unit.

By way of example and not limitation, design of FIG. 1 shows an adaptation of the Rocketdyne high pressure heat exchanger technology utilizing two $9 \times 12$ inch copper channeled plates (which are coined, etched, or milled) brazed to Cres (corrosion resistant stainless steel) or a copper manifold base structure. Design conditions are as noted in Tables I and II. The diesel fuel flow rate for this particular system is 0.01625 lbs/sec at full power (130 BHP) and would be heated by block water to 180° F. which should improve the smoke and particulate limit performance. The use of the panel construction shown in FIG. 1 would appear to allow a high manufacturing rate in production.

Thus, what has been provided by the present invention is a compact, high thermal response diesel fuel preheater.

TABLE II

| DIESEL OIL HEAT EXCHANGER CONDITIONS | |
|---|---|
| OIL SIDE | |
| $\dot{w}$ | = .01625 LB/Sec |
| $A_c$ | = .16 in$^2$ |
| $G_c$ | = .101 Lb/in$^2$ |
| Re | = 1.58 |
| $N_{PR}$ | = 324 |
| Nu | = 5.0 |
| $N_{ST}$ | = .00977 |
| h | = .000474 Btu/in$^2$-sec-°R |
| $A_s$ | = 216 in$^2$ |
| ΔP | = 11.5 psi |
| $T_{in}/T_{out}$ | = 60/179° F. |
| WATER SIDE | |
| $\dot{w}_w$ | = 1 lb/sec |
| $A_w$ | = 2.25 in$^2$ |
| $G_w$ | = .444 lb/in$^2$-sec |
| $Re_w$ | = $\frac{12\,(3600)\,(.444)\,(.5)}{1.0}$ = 9,590 |
| $N_{Pr}$ | = 2.2 |
| $N_{ST_w}$ | = .00236 |
| $h_w$ | = .00104 Btu/in$^2$-sec-°R |
| ΔP | = .011 psi |
| $T_{in}/T_{out}$ | = 180/179 |
| OVERALL | |
| U | = .000326 Btu/In$^2$-Sec-°R |
| $A_s$ | = 216 In$^2$ |
| ΔT | = 13.3° F. |
| Q | = .936 BTU/Sec |

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A diesel engine wherein the improvement comprises a single pass diesel fuel preheater interposed between the fuel pump and combustion chamber for heating diesel fuel prior to its being introduced into the combustion chamber, and wherein said diesel fuel preheater comprises:

a hot fluid chamber having first and second open ends and closed perimeter;

a hot fluid inlet manifold having an inlet port and means for connecting said inlet manifold to said first open end of said hot fluid chamber;

a hot fluid outlet manifold having an outlet port and means for connecting said hot fluid outlet port to said second open end of said hot fluid chamber;

a heat exchanger plate having:
one panel for each cylinder of said diesel engine and wherein each panel comprises at least x number of channels and x−1 number of lands where x is an integer ≧1, and a fuel panel inlet and outlet port located at opposite ends of and passing transversely through said panel;

a fuel inlet manifold having at least one fuel inlet and means for connecting said fuel inlet manifold to each fuel panel inlet port; and a fuel outlet manifold having at least one fuel outlet and means for connecting said fuel outlet manifold to each fuel panel outlet port.

2. The diesel fuel preheater of claim 1 wherein the heat source is exhaust gases.

3. The diesel fuel preheater of claim 1 wherein the heat source is hot water from the engine cooling system.

4. The diesel fuel preheater of claim 1 wherein said hot fluid chamber is cylindrical.

5. The diesel fuel preheater of claim 1 wherein said hot fluid chamber is rectangular.

6. The diesel fuel preheater of claim 1 wherein there are two opposed and parallel heat exchanger plates each having at least two lands in intimate contact with the perimeter of said hot fluid chamber.

* * * * *

UNITED STATES PATENT AND TRADEMARK OFFICE
CERTIFICATE OF CORRECTION

PATENT NO. : 4,349,001
DATED : Sept. 14, 1982
INVENTOR(S) : William R. Wagner

It is certified that error appears in the above-identified patent and that said Letters Patent are hereby corrected as shown below:

Column 1, line 54, delete "1700" and insert therefor --1760--;

Column 2, line 2, delete "effect" and insert therefor --affect--.

Signed and Sealed this

Fourteenth Day of December 1982

[SEAL]

Attest:

GERALD J. MOSSINGHOFF

Attesting Officer   Commissioner of Patents and Trademarks